United States Patent [19]
Landry et al.

[11] Patent Number: 5,084,896
[45] Date of Patent: Jan. 28, 1992

[54] APPARATUS FOR EMITTING A LASER BEAM

[75] Inventors: Jacques Landry, Cergy, France; Philippe Van Der Have, Johannesburg, South Africa; Vincent Pon on, Evanston, Ill.

[73] Assignee: L'Air Liquide, Societe Anonyme pour l'etude ei l'Exploitation des Procedes Georges Claude, Paris, France

[21] Appl. No.: 490,625
[22] PCT Filed: Aug. 2, 1989
[86] PCT No.: PCT/FR89/00405
§ 371 Date: Mar. 20, 1990
§ 102(e) Date: Mar. 20, 1990
[87] PCT Pub. No.: WO90/01820
PCT Pub. Date: Feb. 22, 1990

[30] Foreign Application Priority Data
Aug. 4, 1988 [FR] France ............... 88 10520

[51] Int. Cl.[5] ................... H01S 3/03
[52] U.S. Cl. ................... 372/64; 372/87; 372/34; 372/99; 372/92; 372/66
[58] Field of Search ........... 372/99, 6, 92, 56, 87, 372/88, 34, 66

[56] References Cited

U.S. PATENT DOCUMENTS

| | | | |
|---|---|---|---|
| 3,273,072 | 9/1966 | Koesfer | 372/6 |
| 3,516,001 | 6/1970 | Koester et al. | |
| 4,194,808 | 3/1980 | Marhic et al. | 350/96.32 |
| 4,523,315 | 6/1985 | Stone | 372/6 |
| 4,740,983 | 4/1988 | Azad. | |
| 4,782,493 | 11/1988 | Sabotinov et al. | 372/56 |
| 4,909,582 | 3/1990 | Haidle et al. | 350/96.32 |
| 4,995,699 | 2/1991 | Lo | 350/96.32 |

FOREIGN PATENT DOCUMENTS

| | | |
|---|---|---|
| 0301526 | 2/1989 | European Pat. Off. . |
| 1356934 | 2/1964 | France . |
| 1361121 | 4/1964 | France . |
| 2119825 | 8/1972 | France . |

OTHER PUBLICATIONS

"Oversized Helical Waveguides for Optically Pumped Far-Infrared Lasers", *Physics Letters*, vol. 58A, No. 3, Aug. 1976, by E. Affolter et al., pp. 183-184.
"Lasers with Polyhedral Energy Guides", *Soviet Journal of Quantum Electronics, vol. 1, No. 4, Jan.-Feb. 1972*, by E. Kamenskii et al., pp. 369-375.

*Primary Examiner*—Leon Scott, Jr.
*Attorney, Agent, or Firm*—Young & Thompson

[57] ABSTRACT

A laser apparatus comprises a hollow waveguide containing a lasing gas composition; structure for directing radiation into the waveguide and for directing radiation out of the waveguide; and electrical exciting structure operatively associated with at least part of the waveguide. The waveguide defines a convoluted, continuously curved path having a helicoidal shape. The waveguide has a concave, non-closed transverse section with an open inner portion and is disposed within a gas-tight container containing the lasing gas composition. The waveguide is a laterally open groove formed internally in a cylindrical block disposed within the container.

13 Claims, 3 Drawing Sheets

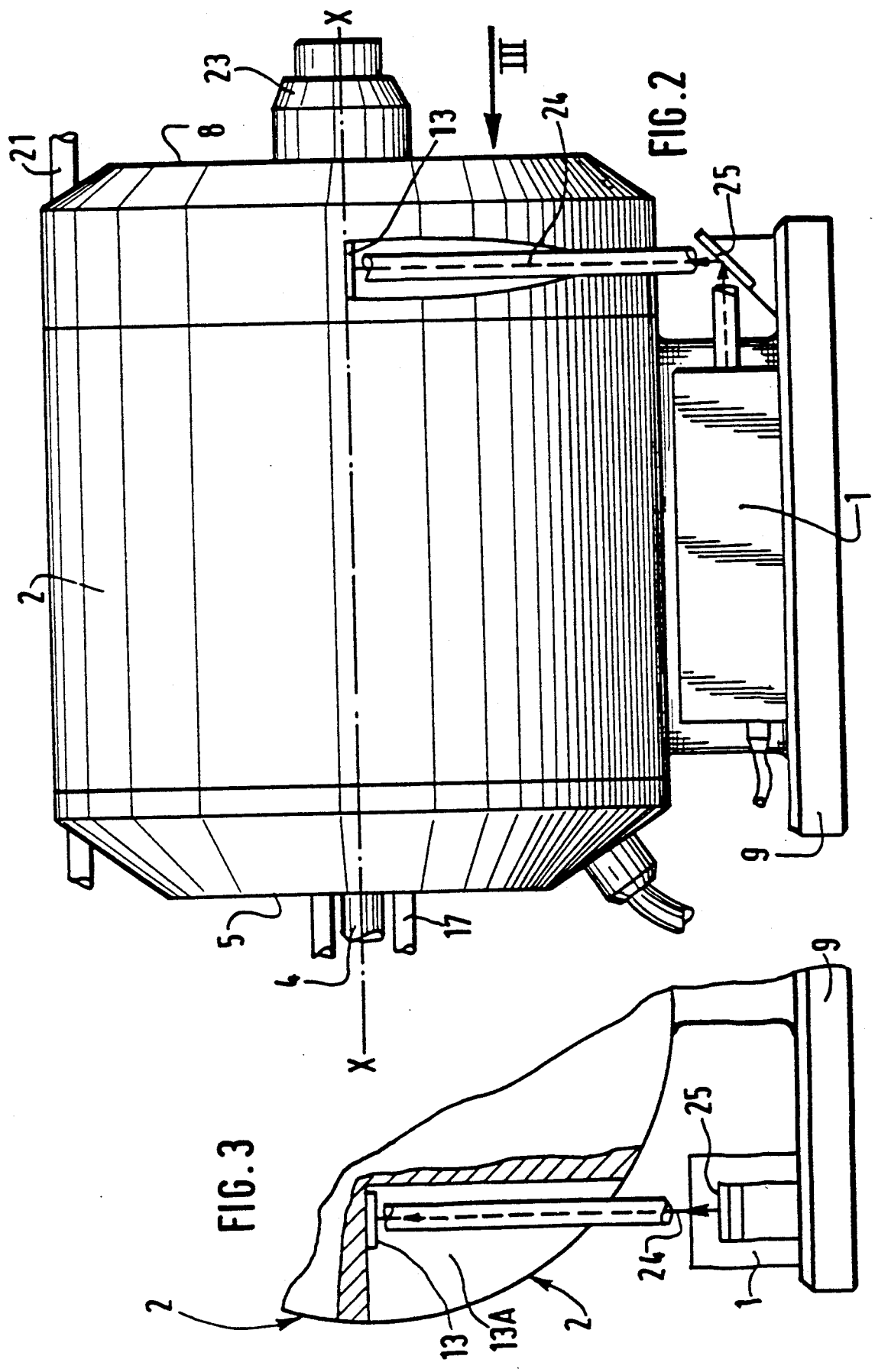

APPARATUS FOR EMITTING A LASER BEAM

DESCRIPTION

The present invention concerns an apparatus for emitting a laser, beam, of the type comprising an amplifying gaseous medium and means for exciting this medium. The invention may be used for producing lasers as well as amplifiers of laser beam.

The current technology of these apparatuses consists in placing in a cavity under vacuum where a laser producing rarefied gas circulates, a certain number of mirrors of which one is partially reflecting, which define a trajectory for the luminous beam consisting of rectilinear segments whose length is much greater than that of the apparatus.

This technology presents the disadvantage of being complicated and of rapidly becoming out of order as a result of transportation, shocks and/or overheating. Moreover, the size of the apparatuses is important as soon as some outlet power is required.

The aim of the invention is to provide an apparatus which is reliable and of reduced dimensions.

For this purpose, it is an object of the invention to provide an apparatus of the above-mentioned type, characterized in that the amplification medium is bounded by a reflecting guide which defines a continuously curved guiding trajectory of the laser beam along a plurality of turns.

The guide may for example consist of a groove hollowed out in a rigid support block and having a concave cross-section.

The trajectory guide may particularly be helicoidal.

Certain embodiments of the invention will now be described with, reference to the annexed drawings in which:

FIG. 2 is a side view showing the side opposite that of FIG. 1, of the same apparatus;

FIG. 3 is a partial end view, partially cut away, taken along arrow III of FIG. 2.

Figure 1:
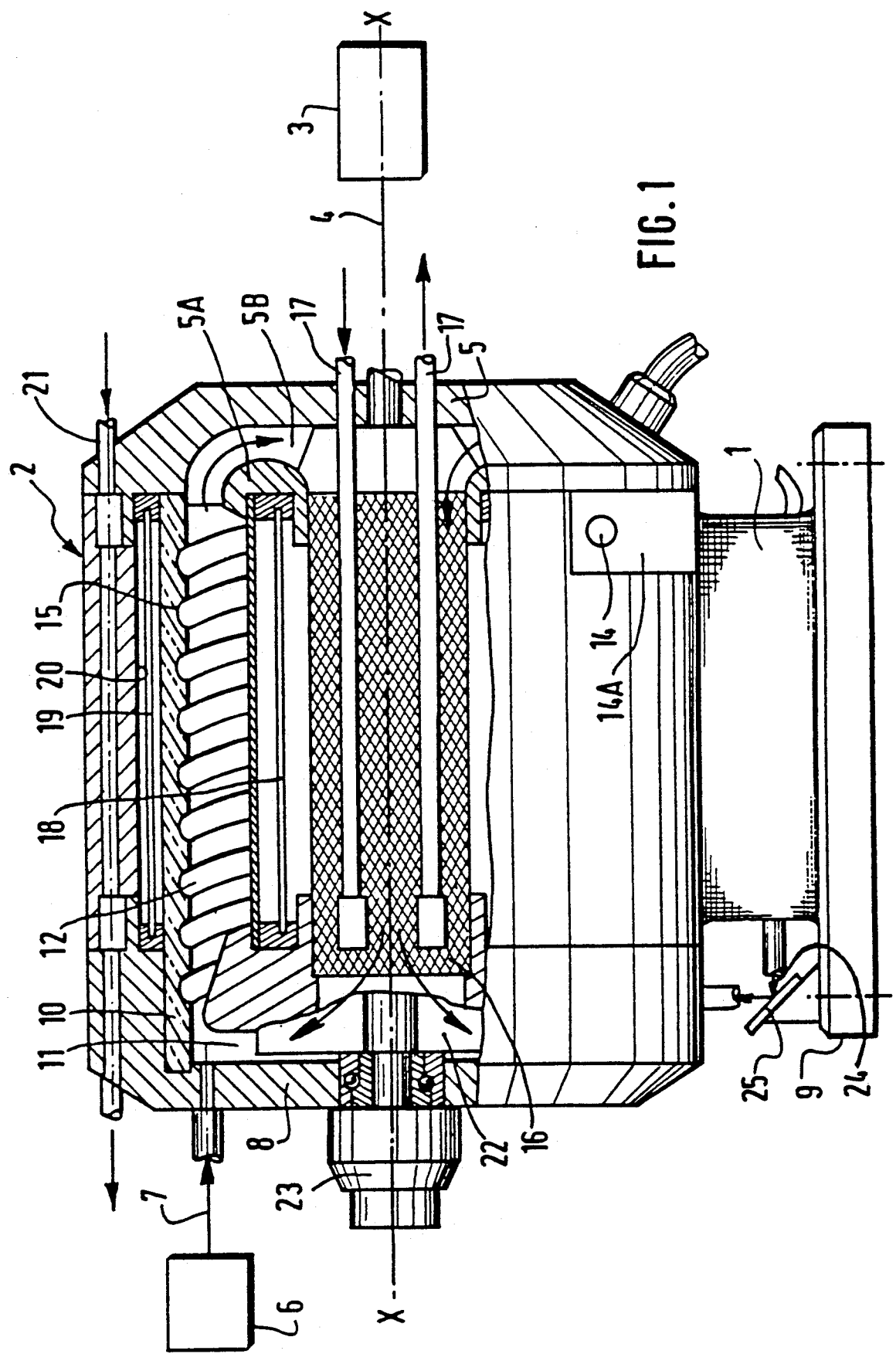
FIG. 1 is a side view, partially in cross-section, of an apparatus for amplifying a laser beam according to the invention.

The apparatus illustrated in FIGS. 1 to 3 is intended to serve as an amplifier for a low power laser 1 (for example a few tens of watts). It comprises a generally cylindrical amplifying enclosure 2, having a horizontal axis X—X, which is connected on the one hand to a vacuum pump 3 by means of a duct 4 from an end wall 5, and on the other hand to a source of laser forming gas 6 by means of a duct 7 which originates from the other end wall 8 of the enclosure. The laser forming gas is for example a mixture of helium, nitrogen and $CO_2$ and may also contain hydrogen, carbon monoxide, oxygen and/or xenon. The enclosure 2 is mounted on a stand 9 which also carries the laser 1 (FIG. 2).

An annular block 10 is mounted in the space 11 provided in the enclosure 2, against the internal cylindrical wall of the latter. In the radially internal face of this block a helicoidal groove 12 has been hollowed out, whose extremity (on the left of FIG. 1, on the right of FIG. 2) is opposite an inlet port 13 (FIG. 2) and whose other extremity is opposite an outlet port 14 (FIG. 1) of the enclosure 2. The port 13 is in the diametrically horizontal plan of the enclosure 2, at the bottom of a channel 13A provided in the enclosure 2 (FIG. 2), also, the port 14 is in the vertical diametrical plane of the enclosure 2, at the bottom of a channel 14A of the enclosure 2 (FIG. 1). The cross-section of the groove 12 is an arc of a circle. Its surface carries a protective and reflecting coating 15 which is analogous to those, used in known manner for the total laser reflection mirrors.

The central space defined by the block 10 is partially occupied by a combination comprising a heat exchanger 16, for example made of a metallic trellis provided with cooling fluid inlet, circulation and outlet ducts 17, this exchanger being surrounded by a cylindrical electrode 18 having an axis X—X. The combination is overhangingly supported by means of a portion 5A of wall 5, connected to the latter by means of radial ribs 5B. The other electrode 19 of the apparatus is also cylindrical and has the same axis X—X, and is mounted in a cavity 20 provided in the cylindrical wall of the enclosure 2 around the block 10. This cylindrical wall is also provided with a cooling fluid inlet and with circulation and outlet ducts 21. The electrodes 18 and 19 are connected to an appropriate source of energy (not represented) which can for example be a radio-frequency or microwave source.

The shaft of a centrifugal ventilator 22 sealingly extends through the front wall 8, the shaft being inside space 11 and being rotated by a motor 23 provided outside the enclosure 2.

In operation, the vacuum pump 3 and the source 6 maintain in the enclosure 11 a laser producing gaseous atmosphere under low pressure which is circulated by ventilator 22 along the arrows indicated in FIG. 1, i.e. radially towards the outside of this ventilator, along wall 8, then longitudinally along block 10, then radially towards the inside along wall 5, then axially towards the ventilator through the heat exchanger 16, which, enables cooling down the pump as well as the electrode 18. The ducts 21 cool the electrode 19 and block 10, the latter constituting an important heat exchange surface.

The laser 1 produces a low power laser beam 24 parallel to the axis X—X. The latter is vertically reflected 90° by means of a 45° mirror 25 which is mounted on the base 9 and is also directed towards the inlet port 13. In the enclosure 11, this beam hits the adjacent extremity of the groove 12 along a tangential direction, and this groove guides the latter by reflection up to the outlet port 14 along a multiple turn helicoidal trajectory. During this trajectory, the power of the beam is progressively amplified by the excitation produced by the two coaxial electrodes 18 and 19.

The apparatus described above provides a compact amplification trajectory of great length and makes possible a laser beam of considerably increased power with respect to the initial beam 25, for example of the order of a kilowatt, to exit through the port 14.

According to a variant which has not been represented and constitutes a limit case, the depth and the curvature of the groove 12 can be zero, and the laser beam is then guided by a smooth cylindrical surface.

The same apparatus can itself constitute a laser. In this case, the laser 1 is omitted and the inlet port is replaced by a totally reflecting mirror while the outlet port is constituted of a partially reflecting mirror, so as to constitute a resonating cavity as it is known in the laser technique.

FIGS. 4 to 7 show other ways of exciting the beam which is carried by the guide 12.

Figure 4:
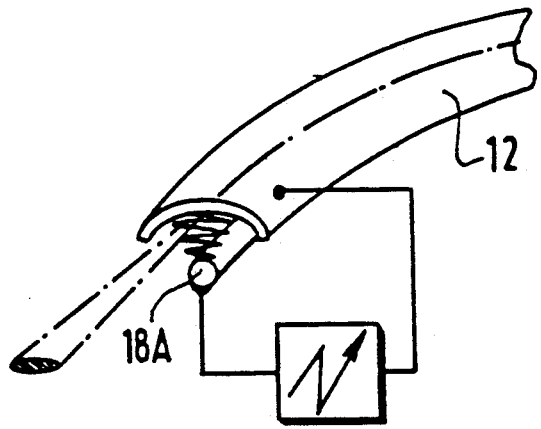
FIGS. 4 to 7 schematic illustrations of a plurality of embodiments of the means of excitation associated with the guide.

In FIG. 4, a helicoidal conductor 18A, replacing the interior electrode 18, follows the guide 12, substantially on the axis of the cross-section of the latter. The other electrode follows a parallel trajectory outside the guide and may be constituted by the guide itself, as shown.

Figure 5:
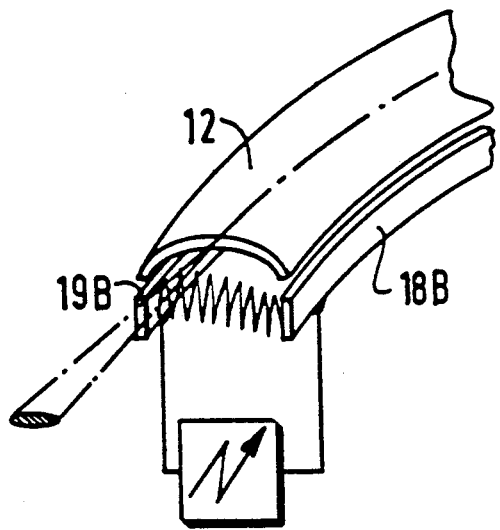
Figure 6:
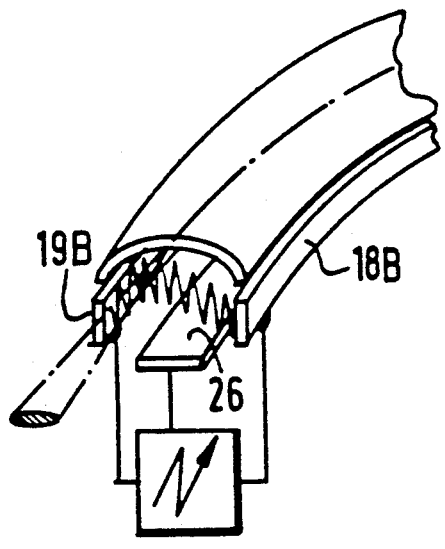

In FIG. 5, the two electrodes 18B and 19B follow the edges of the guide 12. In FIG. 6, a supplementary deflection electrode 26, also helicoidal, is provided between the electrodes 18B and 19B and serves to confine the excitation discharge in the groove defined by this guide.

Figure 7:
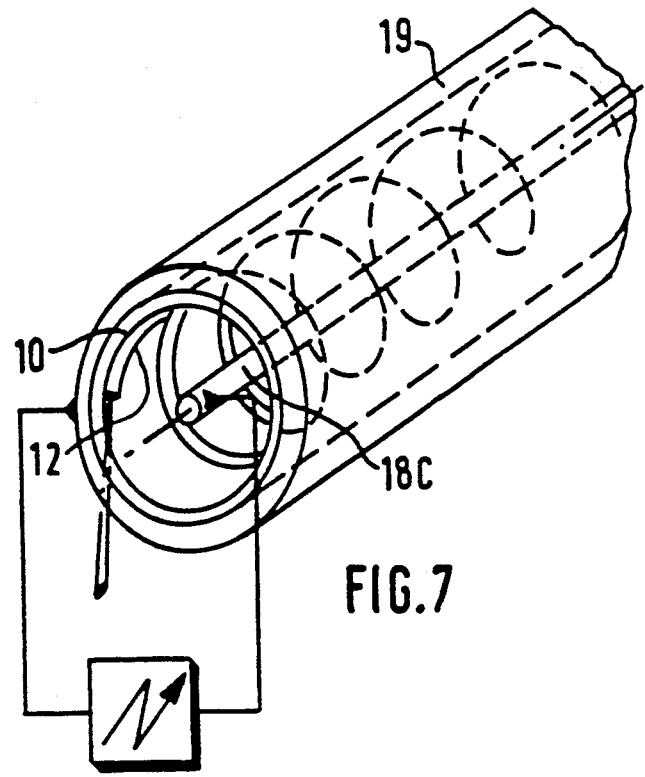

In the embodiment shown in FIG. 7, there is seen the exterior annular electrode 19 of FIG. 1, however the interior electrode consists of an axial conductor 18C.

We claim:

1. In a laser apparatus comprising:
   a hollow waveguide containing a lasing gas composition, the waveguide defining a convoluted, continuously curved path;
   means for directing a laser beam into the waveguide and along said path;
   means for directing said laser beam from said path out of the waveguide; and
   electrical exciting means adjacent at least part of the waveguide for exciting the lasing gas composition thereby progressively to amplify the power of said laser beam as said laser beam travels along said path;
   the improvement wherein the waveguide has a concave, non-closed transverse section with an open inner portion and is disposed within a gas-tight container containing the lasing gas composition.

2. The laser apparatus of claim 1, wherein the waveguide has a helicoidal shape.

3. The laser apparatus of claim 1, wherein the waveguide consists of a laterally open groove formed internally in a cylindrical block disposed within the container.

4. The laser apparatus of claim 1, wherein the electrical exciting means comprises at least one electrode arranged concentrically with respect to the waveguide.

5. The laser apparatus of claim 1, wherein the electrical exciting means comprises at least one electrode extending along said path, adjacent said open inner portion of the waveguide.

6. The laser apparatus of claim 1, further comprising means for cooling the lasing gas composition.

7. The laser apparatus of claim 1, further comprising means within the container, for cooling the lasing gas composition.

8. The laser apparatus of claim 7, said cooling means comprising means within the container for circulating the lasing gas composition within the container.

9. The laser apparatus of claim 1, wherein the transverse section of the waveguide is substantially in the shape of an arc of a circle.

10. The laser apparatus of claim 1, wherein the waveguide is coated internally with a reflective material.

11. The laser apparatus of claim 1, wherein the lasing gas composition contains helium, nitrogen, and carbon dioxide.

12. In a laser apparatus comprising:
    a hollow waveguide containing a lasing gas composition, the waveguide defining a convoluted, continuously curved path;
    means for directing a laser beam into the waveguide and along said path;
    means for directing said laser beam from said path out of the waveguide; and
    electrical exciting means adjacent at least part of the waveguide for exciting the lasing gas composition thereby progressively to amplify the power of said laser beam as said laser beam travels along said path;
    the improvement wherein the waveguide comprises a hollow cylindrical member having a reflective internal surface, said directing means directing said laser beam in a helical path about said reflective surface.

13. The laser apparatus of claim 12, said cylindrical member having an inwardly opening helical groove on said inner surface thereof within which said laser beam travels along said helical path.

* * * * *

UNITED STATES PATENT AND TRADEMARK OFFICE
CERTIFICATE OF CORRECTION

PATENT NO. : 5,084,896
DATED : January 28, 1992
INVENTOR(S) : Jacques LANDRY et al.

It is certified that error appears in the above—identified patent and that said Letters Patent is hereby corrected as shown below:

On the title page:

In the list of inventors, Item [75], change the surname of the third inventor from "Pon on" to --Poncon--.

Signed and Sealed this

Twentieth Day of April, 1993

Attest:

MICHAEL K. KIRK

Attesting Officer

Acting Commissioner of Patents and Trademarks